United States Patent [19]

Campitelli

[11] Patent Number: 4,614,582
[45] Date of Patent: Sep. 30, 1986

[54] AUTOMATIC AND AUTONOMOUS FLOATING PURIFIER WITH ROTARY BELT SEPARATION AND EXTERNAL RADIAL CIRCULATION

[75] Inventor: Antonio Campitelli, Genova, Italy
[73] Assignee: Sea Dupar S.R.L., Italy
[21] Appl. No.: 724,018
[22] Filed: Apr. 17, 1985
[30] Foreign Application Priority Data
  Apr. 17, 1984 [IT] Italy .................... 12495 A/84
[51] Int. Cl.$^4$ .................................. F02B 15/04
[52] U.S. Cl. ........................... 210/242.3; 210/242.4
[58] Field of Search ............ 210/283, 241, 242.1, 210/242.3, 242.4, 400, 401, 922, 923, 924

[56] References Cited
U.S. PATENT DOCUMENTS
  4,165,282  8/1979  Bennett et al. .............. 210/924

Primary Examiner—Frank Sever
Attorney, Agent, or Firm—Jacobs & Jacobs

[57] ABSTRACT

This patent covers an automatic and autonomous floating purifier consisting of a normally cylindrical and upright housing (1) with numerous compartment (4) each divided into two chambers (5, 7), the outer chamber (5) being supplied with polluted water through inlet openings (6) at water surface level where as the other chamber (7) is acting as a collecting tank for the pollutant, which is sticking to a mobile belt (8); a large number of mobile boxes (13) moving on the water surface by means of sliding or articulated devices, receiving the polluted water; numerous suction pumps (17) each aspirating the water from a set of boxes; one or more discharge outlets in the chamber (5) of the compartments (4) discharging the pollutant radially below the water surface so as to create a toroidal circulation by which the surface pollutants are accumulated and directed towards the chambers (5) of the compartments (4) where the oil is separated from the water by adhesion to the belt (8); a storage tank (20) for the pollutants coming from the various chambers (7) and compartments (4); the storage tank being continuously emptied and drained at intervals by pumping (21). The separately driven recirculating pumps (17) will provide a jet by which the purifier can be moved and steered without needing any other conventional propelling devices. Furthermore, the purifier is fitted with all equipment and connections for completely automated operation and remote control.

5 Claims, 5 Drawing Figures

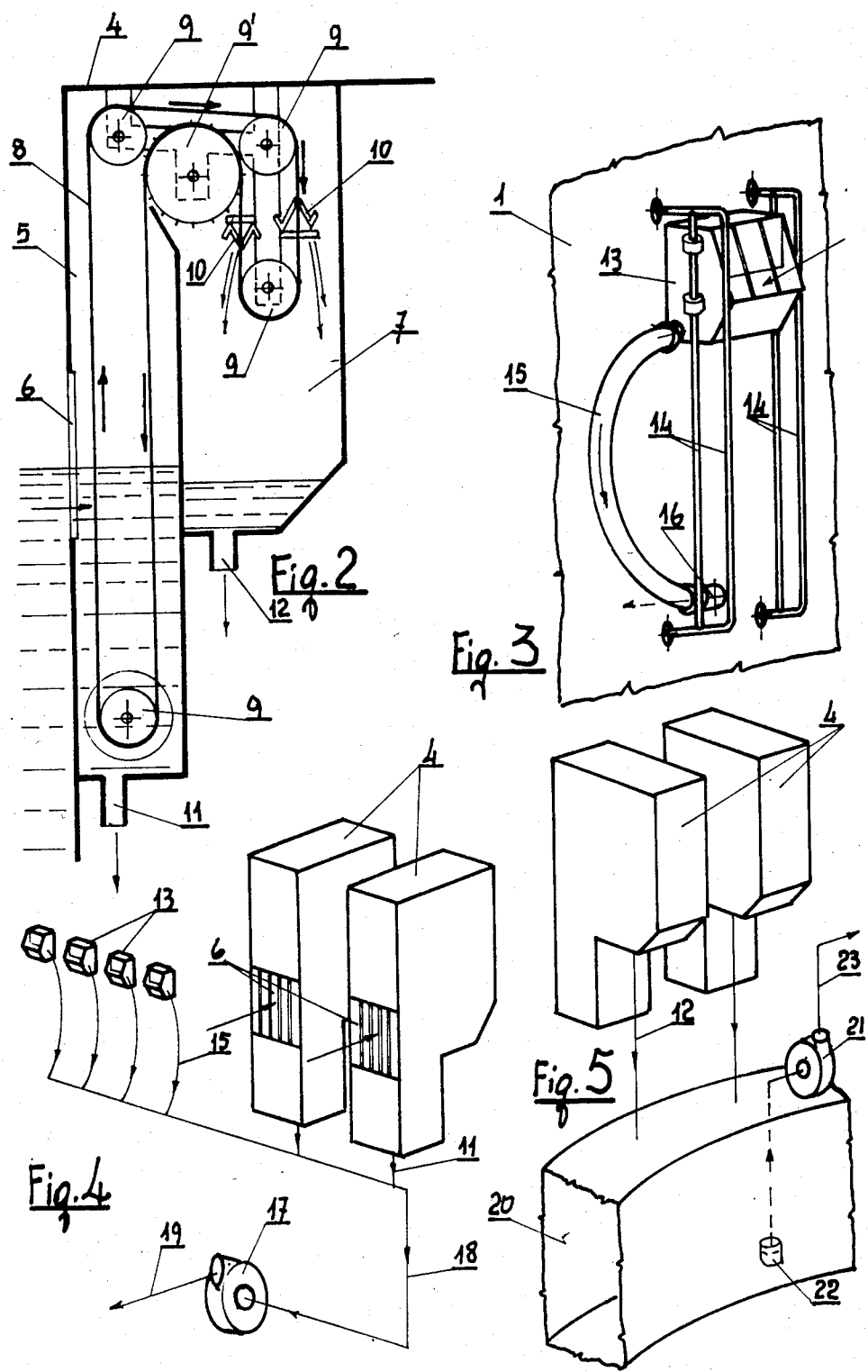

AUTOMATIC AND AUTONOMOUS FLOATING PURIFIER WITH ROTARY BELT SEPARATION AND EXTERNAL RADIAL CIRCULATION

This patent covers an automatic and autonomous floating purifier for the removal of pollutants (especially oil spills) from water sheets.

Various water purifying systems are already known, collecting and separating these pollutants by settlement.

A recent automatic floating purifying system is known from the Italian Patent Application No. 12634 A/82, consisting of a floating box, preferably having a cylindrical watertight configuration, emerging above the water surface like a buoy, with numerous suction intakes along its circumference at waterline level; all water and pollutants penetrating through these inlet openings will reach a settling tank where the pollutant is separated from the water; the purified water is discharged, whereas the pollutants are collected in an upper dome, called "container" and can be recovered.

The above mentioned purifying system, although an improvement on previous purifying techniques, has still many drawbacks, also observed in other commonly used purifying systems.

A first disadvantage lies in the fact that water/impurity separation by settlement is extremely slow and normally requires stopping of the cleaning operations.

A second disadvantage derives from the fact that an optimum separation is impossible, even after settlement, since the purified water still contains an amount of pollutant, whereas the pollutant still contains a certain amount of water.

Another drawback lies in the fact that the purifying capacity is always limited, especially for thin film oil spills and in rough waters, since the purifier is only acting on its circumference and must therefore be continuously shifted. During such transfers the pollutants are only absorbed by the inlet openings located in forward direction.

Furthermore, known purifying systems are not self-propelled so that they always need a tender acting as a tug and as a slop collector.

This Patent has the aim to provide for a floating purifying system without the above mentioned drawbacks.

According to the patent, this aim is achieved by means of a floating purifier, in which separation is not obtained by natural settlement but with the aid of belts removing the pollutants by surface adhesion (such as for instance oil spills), with excellent results and in very short time.

Furthermore, the purifying action is heightened by powerful circulation of the water aspirated from the water surface along the perimeter of the purifier.

The water is then radially cast back in strong jets penetrating deep in the water, thus naturally accumulating and approaching the surface pollutants towards the purifier and extending its range of action so that the system is also efficient during transfer.

According to this Patent, the purifier is also capable of independent transfer, without separate propelling craft, since the radial water jets of the circulating water can act as ejectors when partially operated.

The invention in question is illustrated in its practical implementation in the enclosed drawings in which:

FIG. 2 shows a cross section of the compartment in which the pollutants are separated from the water;

FIG. 3 shows the section device and various water levels for external peripheral circulation;

FIG. 4 shows the schematic diagram for recovery of the pollutants.

Figure 1:
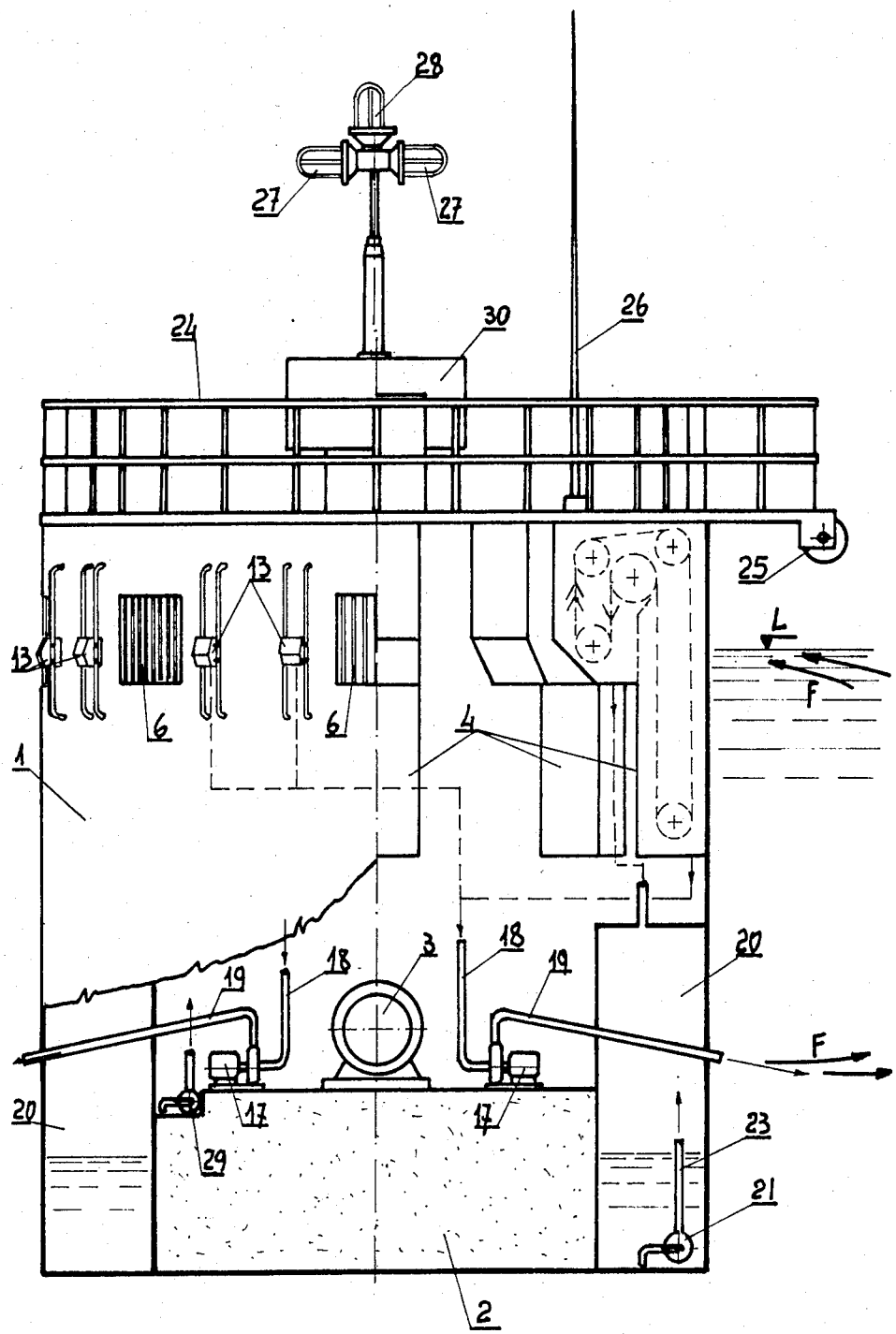
FIG. 1 shows a lateral view and partial section of the purifier, according to the Patent.

With reference to the above illustrations, the watertight housing of the purifier 1 is suitably ballasted 2, so that it can float at the desired depth below the water level L.

The purifier 1 is housing and electric generator 3, complete with fuel tank and all accessories, to ensure independent energy supply for propulsion.

Internally, the purifier features numerous compartments 4, separated from each other, in which the water is purified. Each of these compartments 4, illustrated in detail in FIG. 2, has two separate chambers, the first of which 5 is deeper than the other and is communicating with the outside by 6 outlet openings, whereas the other chamber 7 is collecting the pollutants.

The continuous belt 8 moving through both chambers 5 and 7 is supported by rolls 9, at least one of which is motor-driven, for instance the central roll 9' featuring a peripheral toothing to guide the belt and meshing with the corresponding holes.

The belt passes through the polluted water in the chamber 5 and is cleaned in the chamber 7 by special cleaning devices 10. Both chamber 5 and 7 have bottom drains 11 and 12 respectively. Numerous floating boxes 13 are located outside the purifier, drawing the polluted water in, peripherally. These boxes 13 are always floating on the water surface and they can move vertically by means of sliders mounted on fixed frames 14. Obviously, these boxes can also be kept floating by means of articulated arms.

Each box 13 discharges the polluted water through a flexible hose 15 and union 16 into the purifier.

Several pumps 17 are located on the bottom of the purifier. Each pump has a suction line 18 connected to the drain of some boxes 13 and the discharge 11 of some of the chambers 5 of the compartments 4, whereas the delivery line 19 discharges radially outside the purifier well below the water surface.

This creates a toroidal water movement (arrow F) by which the surface water and the pollutants are driven in a wide range towards the purifier.

The purifier 1 also features a tank 20, anular shaped fo exemplification purposes, in which the pollutants are collected. This tank 20 receives the slop 12 drained from the chambers 7 of the various compartments 4. The pollutant is pumped from the tank 20 by normal or plunger pumps 21 fitted with a foot valve 22 and conveyed through the hose 23 into a tender ship or shore-based tanks. Pumping may be continuous or intermittent.

The purifier equipment also includes inspection doors, guards 24, navigation and safety aids, a nose 25 fitted with the fender to prevent impact with the ship or quay, a receiving antenna 26, signal lamps 27 and an emergency light 28. An antiflooding pump 29 is mounted on the bottom.

An air vent 30 is mounted on top of the purifier.

Furthermore, all equipment is provided for remote control, and manoeuvering of the purifying system.

The operation of the purifier is thus clearly explained. The water discharged from the boxes 13 and chambers 5 in the compartments 4 is radially and peripherally discharged by the high capacity circulating pumps 17 below the water surface L. This circulation thus creates a toroidal flow converging at the surface towards the purifier and enormously boosting its efficiency. Indeed, when converging towards the purifier, the water conveys the pollutants towards the openings 6, letting the slop into the chambers 5 of the belt separation compartments 4. The pollutants are thus accumulated in these chambers coming from a vide area around the purifier. When moving through the chambers 5, the belts will remove the pollutants which stick to the belts in question.

Subsequently, all dirt is removed from the belts by scrapers 10, separated and deposited in the chambers 7 from where it is discharged into the storage tank 20.

Furthermore, the peripheral radial jets created by the circulating pumps 17 can also be used for propulsion and steering of the purifier. This can be achieved by operating at the same time all pumps 17 which will keep the purifier in place since the various flows will counterbalance each other, while operation of the pumps on one side only and stopping of the pumps located on the opposite side will create a thrust driving the purifier in the required direction.

For exemplification purposes, the purifier may feature eight compartments 4 and sixteen boxes 13, the compartments being pairwise and the boxes being foursome connected to a circulating pump 17, as shown in FIG. 4, so that four of these are necessary.

Obviously, the number of compartments, boxes and circulating pumps 17 may be just any, according to the dimensions of the purifier. The tubes 19 may have nozzles. As shown in FIG. 5, all chambers 7 of the compartment 4 are directly discharging into the storage tank 20 in which the polluted liquid can remain even for a considerable period. This means that the purifier can also operate without tender ship or may discharge directly on shore, reaching the quay or pier autonomously from where the operations can be radio-controlled.

Thus, according to the objectives of this Patent, the purifier in question is highly efficient and greatly reduces the time required to eliminate the oil spills or other pollutants due to its much wider range of action with respect to its dimensions and also because of its direct and mechanical oil/water separation capacity without need to wait for settlement and without need for towing.

This purifier can be used in turning basins and water sheets in the sea, lakes, rivers and calm waters, but even in the open sea with wave motion up to scale 5 ("rough sea").

If properly dimensioned, the purifier in question can also be used for impounding backwaters, basins, for cleaning bilges, wells etc., or it can be installed on board of merchant and navy ships.

I claim:

1. A floating water-purifying system for purifying polluted water, which comprises a water-tight cylindrical housing ballasted to float in the polluted water with the axis thereof positioned vertically; a plurality of compartments radially disposed within said housing, each comprising first chamber means for storing purified water, second chamber means for collecting pollutants, outlet means in said first chamber means for discharging purified water therefrom, outlet means in said second chamber means for discharging recovered pollutants therefrom, inlet means on said housing communicating with polluted water outside said housing for admitting polluted water into said first chamber means, pollution removal means comprising endless belt means extending between said chamber means and having a portion thereof passing into water in said first chamber means, said belt means being operable to remove and carry pollutants out of water in said first chamber means to said second chamber means, and means for discharging pollutants carried by said belt means into said second chamber means; a plurality of floating water-collection means for delivering polluted water into said housing carried on the outside of said housing and arranged to float in the polluted water; and a plurality of circulation pumps having an intake and an outlet, said circulation pump intakes being operatively connected to groups of said water-collection means and groups of outlet means of said first chamber means and said circulation pump outlets being radially disposed about said housing below the surface of said polluted water, said circulation pumps including means for discharging water radially outwards of the housing below the surface of the polluted water to create a toroidal circulation converging on the surface of the polluted water toward the housing sufficient for pollutants from a wide area around the housing to be directed toward and into the inlet means of the first chamber means, said circulation pumps further including means for providing selective operation of some or all of the circulation pumps for enabling propulsion and steering of the housing.

2. Apparatus according to claim 1, wherein a pollutant collection tank means is provided within said housing for collection of pollutants recovered in said second chamber means.

3. Apparatus according to claim 1, wherein said floating water-collection means are connected to the intakes of said circulation pumps by means of a flexible hose.

4. Apparatus according to claim 1, wherein said first chamber means extends deeper below the surface of polluted water outside said housing than said second chamber means, said first chamber means being closer to said housing than said second chamber means, and said pollution removal means includes scraper means in said second chamber means for mechanically removing pollutants adhered to said endless belt means, whereby pollutants removed from said belt means are deposited in the bottom of said second chamber means.

5. Apparatus according to claim 4, wherein said first chamber means outlet is at the bottom of said first chamber means for discharging purified water therefrom.

* * * * *